May 6, 1952 — C. K. WIESMAN ET AL — 2,595,498
PROCESS OF PREPARING FROZEN MEAT PACKAGES
Filed Jan. 24, 1947
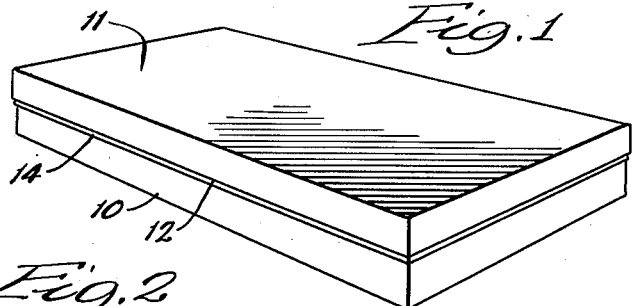
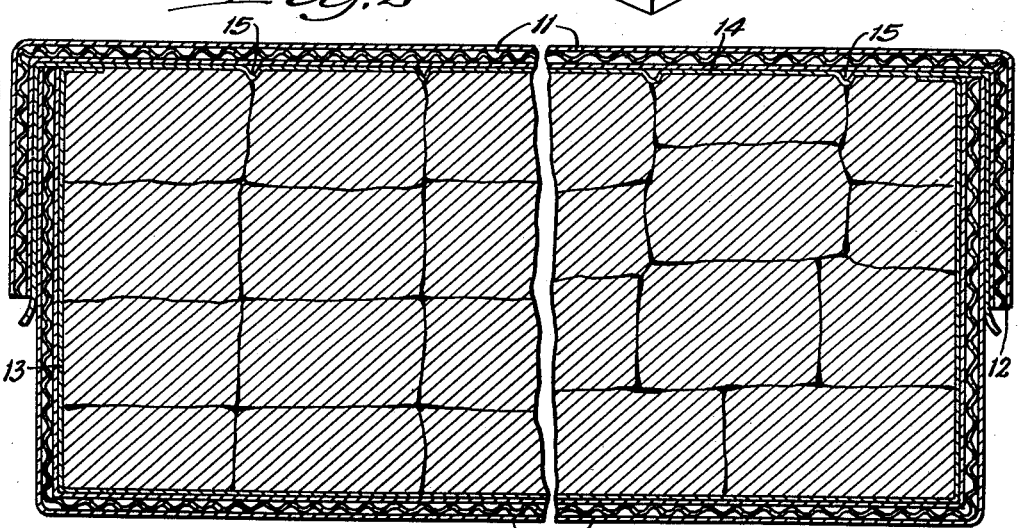
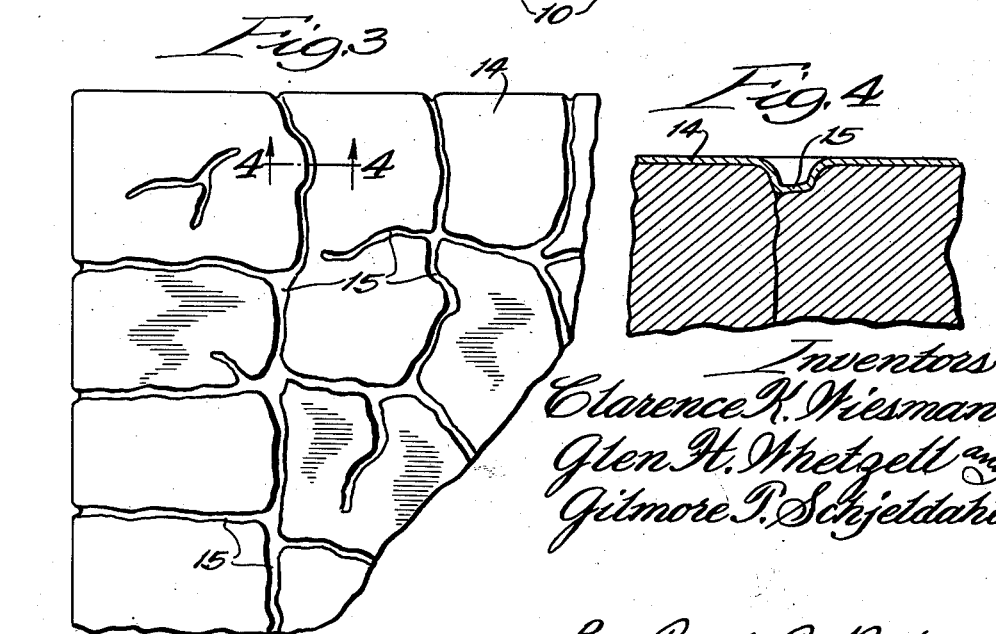
Inventors:
Clarence K. Wiesman,
Glen H. Whetzell and
Gilmore T. Schjeldahl,
By Carl C. Batz
Attorney.

Patented May 6, 1952

2,595,498

UNITED STATES PATENT OFFICE 2,595,498

PROCESS OF PREPARING FROZEN MEAT PACKAGES

Clarence K. Wiesman, Chicago, Ill., and Glenn H. Whetzell and Gilmore T. Schjeldahl, Hobart, Ind., assignors to Armour and Company, Chicago, Ill., a corporation of Illinois Application January 24, 1947, Serial No. 723,936

7 Claims. (Cl. 99—194)

This invention relates to a frozen food packaging process and product.

In the packaging and freezing of foods, it is found that air pockets form between the cover, which is usually transparent, and the product, and during the freezing operation freezer burns occur in such areas, and also frost forms so as to obscure the product below. The transparent sheet extending over the top of the meat contacts the meat through certain areas, but leaves gaps therebelow in other sections, and in the gaps freezer burn and the forming of frost takes place. The resulting product is unattractive by reason of the extensive frost formation and the freezer burn works an injury to the product.

An object of the present invention is to provide a process and means for insuring against such freezer burn below the transparent sheet, while also reducing frost formation to a substantial extent. Yet another object is to provide a packaging means and method whereby air pockets are eliminated to a large extent, while at the same time providing a transparent sheet which dips into the spaces ordinarily occupied by air so as to conform to the sides of the meat in such spaces and thus to eliminate air pockets. Yet another object is to provide a frozen packaged product wherein a transparent or translucent sheet is provided at least across the top surface of the package and which follows not only the plateau surfaces of the meat but also depressed or ravine-like areas in the meat. Other specific objects and advantages will appear as the specification proceeds.

The invention is illustrated in a single embodiment, by the accompanying drawing, in which—

Figure 1 is a perspective view of a container which may be employed in the practice of the invention; Fig. 2, a cross sectional view of the package filled in accordance with our invention; Fig. 3, a top plan view of a portion of the frozen product with the transparent cover thereof adhering to the frozen meat; and Fig. 4, an enlarged transverse detail sectional view, the section being taken as indicated at line 4—4 of Fig. 3.

In the illustration given, 10 designates a container which may be of any suitable character. In the specific illustration given, we employ a cardboard container which serves as the final shaping container. The box is formed of corrugated cardboard and is preferably waxed inside to repel moisture. The container 10 is provided with a top 11 having deep flanges or sides 12. The box is of the telescope type.

Within the box 10 is a liner or pouch 13 which is preferably waterproof and of good folding qualities. For example, a paper material having high wet strength and with one or both surfaces coated with a polyvinyl plastic film is very satisfactory.

If the meat is to be packaged layer style, then one or two layer separators extending transversely of the box will be employed between the layers of meat.

It is preferred to employ a pouch liner 13 which will fit snugly inside the inner dimensions of the box employed. The finished pouch should cover the inner surface of the box, but preferably should not exceed the height of the box. It should be free of wrinkles, and preferably the only folds or crease marks should be those that conform to the folds or crease marks of the box.

When the container has been packed to a level equal to and preferably exceeding the top liner of the container, a top sheet 14 of transparent moisture-vaporproof material is extended over the top of the container and about the outer sides of the box 10. For example, we have found that a cellulose material of about .0008" thickness is satisfactory, the film being obtained by the precipitation of a viscose solution by ammonium salts. With a box of about 15" x 10" x 13", we have found that the top sheet preferably should be about 3" greater in each dimension (length and width) than the outside dimensions of the corrugated cardboard box. This added dimension apparently provides an air seal against the edge of the box when the cover is in place.

We prefer to place the said top cellulose liner in place after the meat has been packed to a level exceeding the top level of the container by about ¼" to ½", and the liner is smoothed over the surface of the product. The smoothing operation brings about complete contact between the product surface and the contacting surface of said cellulose cover and aids in the elimination of air pockets below the cellophane. The close contact between the product surface and the film is highly effective in bringing about the new results which will be described in detail hereinafter.

The box cover 11 is then placed in such a manner that the free edges of said cellulose top liner are brought snugly against the outer top edge of the box. This aids in creating a pressure seal between the box, top liner, and product. The covered container is then inverted and placed on a substantially horizontal support to be frozen. The support may be any type of plate or screen, preferably a conveyor belt which conducts the package through the cold zone. In this condition the weight of the meat seems to press it in a uniform manner against the transparent film.

When the top of the container is removed after freezing, it is found that the transparent sheet, instead of forming a loose body extending in a single plane over the meat, has undergone a sharp change in contour. It has wide areas conforming to the plateaus of the meat and sharp inwardly-turned ravine-like sections conforming to the narrow valleys in the top surface of the meat. Why the cellulose film clings to the inner edges of such ravines, we are unable to state. It is possible that the smoothing operation effectively ties or locks the film to the meat cuts, and subsequently during the inversion operation and the readjustment of the meat cuts, the cellophane is drawn inwardly by reason of the suction of such close contact. At any rate, the result of the operation is that the film conforms not only to the main areas on the nature of plateaus, which lie in a single plane, but also to the depressions or valleys in the top surface of the meat. The conforming of the film to the ravines results in the elimination of air pockets and of the forming of frost and freezer burn in these areas. Upon opening the cover of the box, one is surprised to see the natural color of the meat shown over the entire area and including a great deal of the valley portions. The appearance is very much that of a coardboard puzzle, with spaces between the various plateau portions that make up the puzzle.

The process operates effectively with meat in various forms, either in the form of relatively large cuts or with comminuted meat. The process is effectively used in the packaging of whole livers and other varieties of meats and meat cuts to be frozen.

The transparent moistureproof material used for a top liner is preferably of the plastic type, such as cellulose film obtained by the precipitation of a viscose solution by ammonium salts, rubber hydrochloride, and a variety of other similar materials which are substantially air-impervious and which have sufficient strength to resist tear in the plateau and ravine-conforming operations.

While in the foregoing specification, we have set forth a single illustrative embodiment in substantial detail, it will be understood that the details of such structure and of the process may be modified widely by those skilled in the art without departing from the spirit of our invention.

We claim:

1. In a process for treating meat, the steps of filling an open top container with pieces of meat, placing a transparent sheet over the container and meat so that the same conforms to the surface of the meat, covering the sheet and container with a top, inverting the container and top, and freezing the contents thereof with the container in inverted position.

2. In a process for treating meat, the steps of filling an open top container with pieces of meat, placing a transparent sheet over the container and meat with the sheet extending beyond the container edge, inserting a telescoping top over the container and sheet, inverting the container and top, and freezing the contents thereof with the container in inverted position.

3. In a process for treating meat, the steps of filling a lined and open top container with meat portions, placing a transparent sheet over the container, smoothing the sheet over the meat portions to cause the same to contact the surfaces of the meat, covering the sheet and container with a top, inverting the container, and freezing the contents thereof with the container in inverted position.

4. In a process for treating meat, the steps of filling an open top container with pieces of meat, placing a moisture- and vaporproof film over said container and meat, covering said container with a top and inverting the same with the top lowermost, and freezing the contents of the container in such inverted position.

5. In a process for treating meat, the steps of filling an open top container with meat cuts, placing a substantially air-impervious transparent sheet over the meat, smoothing the sheet into thorough contact with the meat surface, covering the sheet and container with a top, inverting the container, and freezing the contents thereof with the container in inverted position, said transparent sheet being sufficiently flexible to move inwardly with the meat cuts along the interstices therebetween and to eliminate air pockets between said cuts.

6. In a process for treating meat, the steps of filling an open top container with pieces of meat, placing a substantially air-impervious transparent sheet over the container and meat, said sheet extending laterally of said container, pressing a telescoping cover about said container to draw said sheet tightly about the top edge of said container, inverting the container, and freezing the contents thereof with the container in inverted position.

7. In a process for packaging meat in bulk containers, the steps of filling an open top and lined cardboard container with meat, placing a transparent flexible sheet over the container and meat, covering the sheet and container with a top, inverting the container, and freezing the contents thereof with the container in inverted position.

CLARENCE K. WIESMAN.
GLENN H. WHETZELL.
GILMORE T. SCHJELDAHL.

REFERENCES CITED

The following references are of record in the file of this patent:

UNITED STATES PATENTS

| Number | Name | Date |
|---|---|---|
| 1,773,080 | Birdseye | Aug. 12, 1930 |
| 1,924,903 | Birdseye | Aug. 29, 1933 |
| 2,376,583 | De Poix | May 22, 1945 |
| 2,402,121 | Brewster et al. | June 18, 1946 |
| 2,424,693 | Jones | July 29, 1947 |